United States Patent
Lee et al.

(10) Patent No.: US 11,038,177 B2
(45) Date of Patent: Jun. 15, 2021

(54) BINDER FOR LITHIUM-SULFUR BATTERY, POSITIVE ELECTRODE COMPRISING SAME, AND LITHIUM-SULFUR BATTERY

(71) Applicant: LG CHEM, LTD., Seoul (KR)

(72) Inventors: Hyunsoo Lee, Daejeon (KR); Jong Mo Jung, Daejeon (KR); Doo Kyung Yang, Daejeon (KR); Yu Mi Kim, Daejeon (KR); Seong Ho Lee, Daejeon (KR); Gi Su Park, Daejeon (KR); Byounghyo Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/644,683

(22) PCT Filed: Dec. 19, 2018

(86) PCT No.: PCT/KR2018/016212
§ 371 (c)(1),
(2) Date: Mar. 5, 2020

(87) PCT Pub. No.: WO2019/132394
PCT Pub. Date: Jul. 4, 2019

(65) Prior Publication Data
US 2020/0287219 A1    Sep. 10, 2020

(30) Foreign Application Priority Data
Dec. 27, 2017 (KR) .................. 10-2017-0180625

(51) Int. Cl.
*H01M 4/62* (2006.01)
*H01M 4/133* (2010.01)
(Continued)

(52) U.S. Cl.
CPC ........... *H01M 4/622* (2013.01); *H01M 4/133* (2013.01); *H01M 4/136* (2013.01); *H01M 4/364* (2013.01);
(Continued)

(58) Field of Classification Search
CPC ......... H01M 10/0525; H01M 10/0567; H01M 4/62; H01M 4/622; H01M 4/134; H01M 4/8668
(Continued)

(56) References Cited

U.S. PATENT DOCUMENTS

2004/0058246 A1    3/2004   Choi et al.
2009/0305139 A1*  12/2009   Oh ..................... H01M 4/134
                                                    429/231.8
(Continued)

FOREIGN PATENT DOCUMENTS

CN    105304858 B    12/2017
JP    2004-119367 A   4/2004
(Continued)

OTHER PUBLICATIONS

International Search Report for PCT/KR2018/016212 dated Apr. 30, 2019.
(Continued)

*Primary Examiner* — Khanh T Nguyen
(74) *Attorney, Agent, or Firm* — Birch, Stewart, Kolasch & Birch, LLP (57) ABSTRACT

A binder for a lithium-sulfur battery, and a positive electrode and a lithium-sulfur battery including the same, and in particular, to a binder for a lithium-sulfur battery including lithium polyacrylate and polyvinyl alcohol. By including two types of specific polymers, the binder for a lithium-sulfur battery is capable of enhancing electrochemical properties and stability of a positive electrode, and thereby (Continued)

enhancing capacity and lifetime properties of a lithium-sulfur battery.

6 Claims, 4 Drawing Sheets

(51) Int. Cl.
  *H01M 4/136* (2010.01)
  *H01M 4/36* (2006.01)
  *H01M 4/58* (2010.01)
  *H01M 4/587* (2010.01)
  *H01M 10/052* (2010.01)
  *H01M 4/02* (2006.01)

(52) U.S. Cl.
  CPC ......... *H01M 4/587* (2013.01); *H01M 4/5815* (2013.01); *H01M 10/052* (2013.01); *H01M 2004/028* (2013.01)

(58) Field of Classification Search
  USPC ..................................... 429/217, 336, 231.8
  See application file for complete search history.

(56) References Cited

U.S. PATENT DOCUMENTS

| | | | |
|---|---|---|---|
| 2012/0070737 A1 | 3/2012 | Son et al. | |
| 2013/0236778 A1* | 9/2013 | Choi | H01M 4/622 429/211 |
| 2015/0044550 A1 | 2/2015 | Park et al. | |
| 2015/0072248 A1 | 3/2015 | Watanabe et al. | |
| 2015/0171469 A1 | 6/2015 | Kourtakis et al. | |
| 2015/0287992 A1 | 10/2015 | Osaka et al. | |
| 2015/0303456 A1 | 10/2015 | Yoo et al. | |
| 2016/0164103 A1 | 6/2016 | Son et al. | |
| 2016/0240854 A1* | 8/2016 | Sakurai | H01M 10/0525 |
| 2016/0351947 A1 | 12/2016 | Kamo et al. | |
| 2017/0077497 A1 | 3/2017 | Ogata et al. | |

FOREIGN PATENT DOCUMENTS

| | | | |
|---|---|---|---|
| JP | 2012-64574 A | 3/2012 | |
| JP | 2013-225496 A | 10/2013 | |
| JP | 2014-41811 A | 3/2014 | |
| JP | 2015-053152 * | 3/2015 | ........ H01M 10/0525 |
| JP | 2015-53152 A | 3/2015 | |
| JP | 2015-201270 A | 11/2015 | |
| KR | 10-2012-0029899 A | 3/2012 | |
| KR | 10-2013-0104013 A | 9/2013 | |
| KR | 10-2014-0127886 A | 11/2014 | |
| KR | 10-2015-0017580 A | 2/2015 | |
| KR | 10-2015-0032670 A | 3/2015 | |
| KR | 10-2019-0088610 A | 7/2015 | |
| KR | 10-2015-0120795 A | 10/2015 | |
| KR | 10-2016-0046775 A | 4/2016 | |
| KR | 10-2016-0118258 A | 10/2016 | |
| KR | 10-2017-0033123 A | 3/2017 | |
| KR | 10-2019-0022332 A | 3/2019 | |
| WO | WO 2013/141195 A1 | 9/2013 | |

OTHER PUBLICATIONS

Extended European Search Report issued in European Application No. 18897480.2, dated Oct. 22, 2020.

* cited by examiner

BINDER FOR LITHIUM-SULFUR BATTERY, POSITIVE ELECTRODE COMPRISING SAME, AND LITHIUM-SULFUR BATTERY

TECHNICAL FIELD

This application claims the benefit of Korean Patent Application No. 10-2017-0180625 on Dec. 27, 2017 with the Korean Intellectual Property Office, the disclosure of which is herein incorporated by reference in its entirety.

The present invention relates to a binder for a lithium-sulfur battery, a positive electrode and a lithium-sulfur battery including the same.

BACKGROUND ART

As electronic devices and communication devices have rapidly become smaller, lighter and more sophisticated recently, and necessity of electric vehicles has highly emerged regarding exhaustion of petroleum resources and environmental problems, there have been increasing demands for improving performance and lifetime of secondary batteries used as an energy source of these products. As secondary batteries satisfying such demands, lithium-sulfur batteries using a sulfur-based compound as a positive electrode active material have received attention.

A lithium-sulfur battery is a secondary battery using a sulfur-based material having sulfur-sulfur bonds as a positive electrode active material, and using lithium metal, a carbon-based material having intercalation/deintercalation of lithium ions or silicon, tin or the like forming an alloy with lithium as a negative electrode active material.

In a lithium-sulfur battery, a reduction reaction occurs in a positive electrode by sulfur receiving electrons and an oxidation reaction occurs in a negative electrode by lithium being ionized when discharged. Specifically, sulfur is cyclic $S_8$ before discharge, and electric energy is stored and produced using an oxidation-reduction reaction in which an oxidation number of sulfur decreases as sulfur-sulfur bonds are broken during a reduction reaction (discharge), and an oxidation number of sulfur increases as sulfur-sulfur bonds are formed again during an oxidation reaction (charge).

Particularly, a lithium-sulfur battery has theoretical discharge capacity of 1,675 mAh/g and theoretical energy density of 2,600 Wh/kg, theoretical energy density higher by approximately 5 times compared to currently studied lithium ion batteries (approximately 570 Wh/kg), and therefore, is a battery capable of obtaining high capacity, high energy density and long lifetime. In addition, sulfur, a main material of a positive electrode active material, has advantages of having a low atomic weight, being readily supplied by being abundant in resources, being low priced, having no toxicity and being environmental-friendly, and therefore, extensive studies have been progressed on lithium-sulfur batteries with an advantage of being usable as an energy source of medium-to-large devices such as electric vehicles as well as portable electronic devices.

Despite such advantages of high capacity properties, environmental-friendliness and economic feasibility, a lithium-sulfur battery has not been commercialized since sufficient performance and driving stability are not secured by a significant decrease in the capacity as a cycle progresses in actual driving, and a rapid decrease in the battery lifetime resulted therefrom. As a result, various technologies to enhance performance and lifetime of a lithium-sulfur battery to a practically applicable level have been proposed.

As one example, Korean Patent Application Publication No. 2015-0032670 discloses that a problem of battery capacity decrease may be improved by including a nitrogen-containing additive, a sulfur-containing additive or an organic peroxide in an electrolyte.

In addition, Korean Patent Application Publication No. 2016-0046775 discloses that cycle properties of a lithium-sulfur battery may be enhanced through providing a positive electrode coating layer formed with an amphipathic polymer on a part of a surface of a positive electrode active site including a sulfur-carbon composite.

These patents have somewhat improved a problem of performance or lifetime decrease in a lithium-sulfur battery by varying an electrolyte composition or introducing a coating layer in a positive electrode, however, the effect is not sufficient. In addition, using an additive causes a problem of electroconductive deterioration or facilitating battery side reactions, and forming a coating layer has a disadvantage of being time-consuming and costly as sulfur is lost during a surface treatment process. Accordingly, development of a commercializable lithium-sulfur battery by effectively preventing capacity and lifetime decreases in a lithium-sulfur battery has been more required.

PRIOR ART DOCUMENTS

Patent Documents

Korean Patent Application Publication No. 2015-0032670 (2015 May 27), Electrochemical cells comprising electrolyte additives and ionomer articles, and methods for making and using the same Korean Patent Application Publication No. 2016-0046775 (2016 Apr. 29), Cathode for lithium-sulfur battery and method of preparing the same

DISCLOSURE

Technical Problem

As a result of extensive studies in view of the above, the inventors of the present invention have identified that using a binder including two different types of polymers in a positive electrode improves electrochemical properties and stability of the positive electrode, and thereby enhances capacity and lifetime of a lithium-sulfur battery including the same, and have completed the present invention.

Accordingly, an aspect of the present invention provides a binder for a lithium-sulfur battery enhancing capacity and lifetime properties of a battery.

Another aspect of the present invention provides a positive electrode for a lithium-sulfur battery including the binder and a lithium-sulfur battery including the same.

Technical Solution

According to an aspect of the present invention, there is provided a binder for a lithium-sulfur battery comprising lithium polyacrylate and polyvinyl alcohol.

The binder for a lithium-sulfur battery may comprise the lithium polyacrylate in 85% by weight to 95% by weight and the polyvinyl alcohol in 5% by weight to 15% by weight based on the total weight of the binder for a lithium-sulfur battery.

The lithium polyacrylate and the polyvinyl alcohol may be comprised in a weight ratio of 85:15 to 95:5.

According to another aspect of the present invention, there is provided a positive electrode for a lithium-sulfur battery comprising the binder and a positive electrode active material.

According to another aspect of the present invention, there is provided a lithium-sulfur battery comprising the positive electrode.

Advantageous Effects

By including both lithium polyacrylate and polyvinyl alcohol, a binder for a lithium-sulfur battery according to the present invention is capable of improving electrochemical properties and stability of a positive electrode, and thereby enhancing capacity and lifetime properties of a lithium-sulfur battery.

BEST MODE

Hereinafter, the present invention will be described in more detail.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Terms used in the present invention are for describing specific embodiments only and do not intend to limit the present inventive. Singular forms used herein include plural forms as well, unless the context clearly indicates otherwise. In the present invention, terms such as 'include' or 'have' are to specify the presence of features, numbers, steps, behaviors, constituents, components or combinations thereof described in the specification, and need to be construed as not excluding the possibility of presence or addition of one or more of other features, numbers, steps, behaviors, constituents, components or combinations thereof.

A lithium-sulfur battery has higher theoretical discharge capacity and theoretical energy density among many lithium secondary batteries, and has received attention as a next-generation battery with an advantage of sulfur used as a positive electrode active material being abundant in resources and low-priced and being environmental-friendly.

Despite such advantages, theoretical discharge capacity and theoretical energy density are not fully obtained in actual driving. In addition, problems of significant capacity decease and lifetime shortening occur as a charge and discharge cycle progresses, which limits application and commercialization in various fields.

A lithium secondary battery may be manufactured in various shapes such as cylindrical, angular or coin, and a coin cell is common. Recently, a pouch cell using a pouch such as an aluminum laminate sheet as a battery packaging material has received attention since it exhibits high battery capacity per unit area and, by having flexibility, has free shape transformation and is readily applied to products. In addition, with advantages of excellent stability and products using the battery being slimmer and lighter with a light weight of the pouch cell, the use is gradually increasing. However, some of lithium-sulfur batteries that are currently in a commercialization stage by securing performance at a certain level or higher are mostly a coin cell, and there are limitations in the field of use. Accordingly, performance and lifetime of a pouch-type lithium-sulfur battery need to be improved in order to commercialize a lithium-sulfur battery and diversify its applications across all industries.

In view of the above, the present invention provides a binder for a lithium-sulfur battery including two types of specific polymers when preparing a positive electrode in order to improve problems of reactivity and stability decline in the positive electrode, main causes declining performance and lifetime of a lithium-sulfur battery.

Specifically, the binder for a lithium-sulfur battery according to the present invention comprises lithium polyacrylate and polyvinyl alcohol.

A binder has been used in the prior art for keeping a positive electrode active material on a positive electrode current collector, and organically connecting the positive electrode active materials, however, the present invention uses two types of polymers performing an additional role such as suppressing side reactions or enhancing dispersibility as well as its original function as a binder.

In the present invention, the lithium polyacrylate (PAA-Li) is substituting hydrogen of a hydroxyl group (—OH) included in poly(acrylic acid) (PAA) by lithium (Li). Particularly, by including lithium instead of hydrogen at the end, the lithium polyacrylate performs a role of enhancing positive electrode stability with no generation of hydrogen gas ($H_2$), one type of side reaction products produced while driving a battery or cell in the prior art, as well as performing a role as a binder increasing adhesion between a positive electrode active material and a positive electrode active material and a positive electrode active material and a positive electrode current collector.

The lithium polyacrylate is one type of an alkali metal salt-type polymer, and may be prepared by neutralizing poly(acrylic acid) with a lithium-including base compound, and as the neutralization method herein, common methods may be used. For example, the base compound may be lithium hydroxide (LiOH).

The lithium polyacrylate may have a molecular weight of 450,000 to 1,350,000, and preferably 750,000 to 1,250,000. When the lithium polyacrylate has a molecular weight corresponding to the above-mentioned range, the above-described effects may be obtained while being suitably used in a positive electrode, and on the contrary, the molecular weight being out of the above-mentioned range may cause a problem of declining positive electrode performance by acting as resistance or causing unnecessary reactions.

The lithium polyacrylate may be included in an amount of 85% by weight to 95% by weight and preferably in 87.5% by weight to 94% by weight, based on the total weight of the binder for a lithium-sulfur battery. When the content of the lithium polyacrylate is less than the above-mentioned range, the binding effect decreases and the effect of decreasing hydrogen gas generation decreases, and on the contrary, the content being greater than the above-mentioned range may adversely affect battery performance by acting as resistance or the positive electrode active material or conductive material content relatively decreasing when introduced to a positive electrode. Therefore, a proper content is preferably determined in the above-mentioned range. However, a specific optimal content of the lithium polyacrylate may set differently depending on a positive electrode to provide and other properties and usage environment of a battery provided therewith, and such application is not limited by the above-mentioned preferred range.

In the present invention, the polyvinyl alcohol performs a role of a dispersant in a positive electrode, and increases electrochemical reactivity of the positive electrode by enhancing dispersibility of a positive electrode active material. In addition, the polyvinyl alcohol also performs a role of keeping the positive electrode active material on a positive electrode current collector.

The polyvinyl alcohol may have viscosity of 3.2 mPas to 3.6 mPas, and a degree of saponification of 87 mol % to 89 mol %. For example, a commercially available product of the polyvinyl alcohol may include PVA-203 of Kuraray Co., Ltd.

When the polyvinyl alcohol has a molecular weight corresponding to the above-mentioned range, a target effect of improving dispersibility may be obtained while capable of being used in a positive electrode, and on the contrary, the molecular weight being out of the above-mentioned range may cause a problem of declining positive electrode performance by acting as resistance or causing unnecessary reactions.

The polyvinyl alcohol may be included in an amount of 5% by weight to 15% by weight and preferably in 6% by weight to 12.5% by weight, based on the total weight of the binder for a lithium-sulfur battery. When the content of the polyvinyl alcohol is less than the above-mentioned range, the dispersibility improving effect is insignificant, and a positive electrode active material and a conductive material may be detached due to decline in the physical properties of a positive electrode, and when the content is greater than above-mentioned range on the contrary, ratios of the positive electrode active material and the conductive material decrease in the positive electrode causing a decrease in the battery capacity. Therefore, a proper content is preferably determined in the above-mentioned range. However, a specific optimal content of the polyvinyl alcohol may set differently depending on a positive electrode to provide and other properties and usage environment of a battery provided therewith, and such application is not limited by the above-mentioned preferred range.

Herein, the binder for a lithium-sulfur battery according to the present invention may include the lithium polyacrylate and the polyvinyl alcohol in a weight ratio of 85:15 to 95:5 and preferably in a weight ratio of 87.5:12.5 to 94:6. When the lithium polyacrylate ratio increases in the above-mentioned weight ratio range, slurry dispersibility may decrease and physical properties of the prepared positive electrode may decline readily detaching the positive electrode active material and the conductive material. When the lithium polyacrylate ratio further decreases on the contrary, slurry dispersibility may increase and adhesive strength between the positive electrode active material and the conductive material may increase, however, a problem of declining lifetime properties of a cell manufactured using the electrode may occur.

The present invention also provides a positive electrode for a lithium-sulfur battery including the binder for a lithium-sulfur battery described above.

The positive electrode for a lithium-sulfur battery comprises the binder for a lithium-sulfur battery of the present invention and a positive electrode active material.

The binder for a lithium-sulfur battery is by the present invention, and follows the descriptions provided above.

The binder may be included in an amount of 1% by weight to 10% by weight and preferably in 7.5% by weight to 8% by weight, based on the total weight of the positive electrode slurry composition for a lithium-sulfur battery. When the content of the binder is less than the above-mentioned range, the active material, the conductive material or the like may be detached declining physical properties of the positive electrode, and when the content is greater than the above-mentioned range on the contrary, the positive electrode active material ratio may decrease declining battery capacity. Therefore, a proper content is preferably determined in the above-described range.

A sulfur-based compound may be included as the positive electrode active material. The sulfur-based compound may be at least one selected from the group consisting of inorganic sulfur ($S_8$), $Li_2S_n$ ($n \geq 1$), disulfide compounds, organosulfur compounds and carbon-sulfur polymers (($C_2S_x)_n$, x=2.5 to 50, n≥2). Inorganic sulfur ($S_8$) may be preferably used.

The sulfur-based compound alone does not have electrical conductivity, and is composited with a conductive material when used. Preferably, the positive electrode active material may be a sulfur-carbon composite.

In the sulfur-carbon composite, the carbon is a porous carbon material and provides a skeleton capable of uniformly and stably fixing sulfur, the positive electrode active material, and supplements electrical conductivity of sulfur to smoothly progress an electrochemical reaction.

The porous carbon material may be generally prepared by carbonizing a precursor of various carbon materials. The porous carbon material includes irregular pores therein, and the pores may have an average diameter in a range of 1 nm to 200 nm, and pore density or porosity may be in a range of 10% to 90% of the total porous volume. When the pores have an average diameter of less than the above-mentioned range, the pore size is merely a molecular level making sulfur impregnation impossible, and when the pores have an average diameter of greater than the above-mentioned range, mechanical strength of the porous carbon is weakened, which is not preferred to be used in an electrode preparation process.

The form of the porous carbon material may be a globular type, a rod type, a needle type, a plate type, a tube type or a bulk type, and may be used without limit as long as it is commonly used in a lithium-sulfur battery.

The porous carbon material may be used without limit as long as it is a material having a porous structure or a high specific surface area, and commonly used in the art. Examples of the porous carbon material may be at least one selected from the group consisting of graphite; graphene; carbon black such as denka black, acetylene black, ketjen black, channel black, furnace black, lamp black or thermal black; carbon nanotubes (CNT) such as single-walled carbon nanotubes (SWCNT) or multi-walled carbon nanotubes (MWCNT); carbon fibers such as graphite nanofibers (GNF), carbon nanofibers (CNF) or activated carbon fibers (ACF); natural graphite, artificial graphite, expanded graphite and activated carbon, but are not limited thereto. The porous carbon material may preferably be a carbon nanotube.

In the sulfur-carbon composite, the sulfur is located on at least any one surface of inner and outer surfaces of the pores of the porous carbon material, and herein, may be present in a region of less than 100%, preferably 1% to 95% and more preferably 60% to 90% of the whole inner and outer surface of the porous carbon material.

The positive electrode active material may further include at least one additives selected from among transition metal elements, group IIIA elements, group IVA elements, sulfur compounds of these elements and alloys of these elements and sulfur, in addition to the above-described composition.

As the transition metal element, Sc, Ti, V, Cr, Mn, Fe, Co, Ni, Cu, Zn, Y, Zr, Nb, Mo, Tc, Ru, Rh, Pd, Os, Ir, Pt, Au, Hg or the like may be included. As the group IIIA element, Al, Ga, In, Ti or the like may be included, and as the group IVA element, Ge, Sn, Pb or the like may be included.

The positive electrode active material may be included in an amount of 50% by weight to 95% by weight and preferably in 70% by weight to 95% by weight, based on the total weight of the positive electrode slurry composition for a lithium-sulfur battery. When the positive electrode active material is included in less than the above-mentioned range, the electrode reaction is difficult to be sufficiently obtained, and when included in greater than the above-mentioned range, sufficient electrode reaction is difficult to be secured due to a relatively insufficient content of the conductive material and the binder. Therefore, a proper content is preferably determined in the above-mentioned range.

In addition, the positive electrode for a lithium-sulfur battery of the present invention may further include a conductive material. The conductive material is a material connecting an electrolyte and a positive electrode active material to perform a role of a path through which electrons migrate from a current collector to the positive electrode active material, and materials having porosity and conductivity may be used without limit.

For example, a carbon-based material having porosity may be used as the conductive material, and examples of such a carbon-based material may include carbon black, graphite, graphene, activated carbon, carbon fibers and the like, and metallic fibers such as a metal mesh; metallic powders such as copper, silver, nickel or aluminum; or organic conductive materials such as polyphenylene derivatives may be included. The conductive materials may be used either alone or as a mixture.

The conductive material may be included in an amount of 1% by weight to 10% by weight and preferably in 1% by weight to 5% by weight, based on the total weight of the positive electrode slurry composition for a lithium-sulfur battery. When the content of the conductive material included in the positive electrode is less than the above-mentioned range, non-reactive parts increase in the positive electrode active material in the electrode ultimately causing a capacity decrease, and the content being greater than the above-mentioned range adversely affects high efficiency discharge properties and cycle lifetime. Therefore, a proper content is preferably determined in the above-described range.

In addition, the positive electrode for a lithium-sulfur battery of the present invention may further include a binder. The binder is for increasing binding strength between components forming the positive electrode and between these and a current collector, and all binders known in the art may be used.

Example of the binder may include one selected from the group consisting of fluorine resin-based binders including polyvinylidene fluoride (PVdF) or polytetrafluoroethylene (PTFE); rubber-based binders including styrene butadiene rubber (SBR), acrylonitrile-butadiene rubber or styrene-isoprene rubber; cellulose-based binders including carboxyl methyl cellulose (CMC), starch, hydroxypropyl cellulose or regenerated cellulose; polyalcohol-based binders; polyolefin-based binders including polyethylene or polypropylene; polyimide-based binders; polyester-based binders and silane-based binders, or mixtures or copolymers of two or more types thereof.

The positive electrode for a lithium-sulfur battery according to the present invention including the binder for a lithium-sulfur battery described above and a positive electrode active material may be prepared using common methods.

For example, as for a method for preparing the positive electrode of the present invention, the binder is dissolved in a solvent for preparing slurry first, and then a conductive material is dispersed thereinto. As the solvent for preparing the slurry herein, those capable of uniformly dispersing the above-described positive electrode active material, the binder and the conductive material and readily evaporating are preferably used, and typical examples thereof may include acetonitrile, methanol, ethanol, tetrahydrofuran, water, isopropyl alcohol and the like. Next, the positive electrode active material, or selectively together with additives, is uniformly dispersed again in the conductive material-dispersed solvent to prepare positive electrode slurry. The amounts of the solvent, the positive electrode active material or selectively the additives included in the slurry do not carry an important meaning in the present application, and it is sufficient that the slurry has proper viscosity to be readily coated.

The slurry prepared as above is coated on a current collector, and the result is vacuum dried to form a positive electrode. The slurry may be coated on the current collector to a proper thickness depending on the slurry viscosity and the thickness of the positive electrode to form.

The current collector is not particularly limited as long as it may be prepared to generally have a thickness of 3 μm to 500 μm, and has high conductivity without inducing chemical changes to a battery. Specifically, conductive materials such as stainless steel, aluminum, copper or titanium may be used, and more specifically, a carbon-coated aluminum current collector may be used. Using a carbon-coated aluminum substrate has advantages compared to using aluminum substrates without carbon coating in that adhesive strength for a positive electrode active material is superior, contact resistance is low, and corrosion of aluminum caused by polysulfide is prevented. In addition, the current collector may have various forms such as films, sheets, foil, nets, porous bodies, foams or non-woven fabrics.

The present invention also provides a lithium-sulfur battery including the positive electrode for a lithium-sulfur battery described above.

The lithium-sulfur battery includes a positive electrode; a negative electrode; and a separator and an electrolyte interposed between the positive electrode and the negative electrode, and as the positive electrode, the positive electrode for a lithium-sulfur battery according to the present invention is used.

The positive electrode is by the present invention, and follows the descriptions provided above.

The negative electrode may include a negative electrode current collector and a negative electrode active material layer formed on one surface or both surfaces thereof. Alternatively, the negative electrode may be a lithium metal plate.

The negative electrode current collector is for supporting the negative electrode active material, and is not particularly limited as long as it has excellent conductivity and is electrochemically stable in a voltage area of a lithium secondary battery. Examples thereof may include copper, stainless steel, aluminum, nickel, titanium, palladium, baked carbon, copper or stainless steel of which surface is treated with carbon, nickel, silver or the like, aluminum-cadmium alloys and the like.

The negative electrode current collector may strengthen binding strength with the negative electrode active material by forming micro unevenness on a surface thereof, and various forms such as films, sheets, foil, meshes, nets, porous bodies, foams or non-woven fabrics may be used.

As the negative electrode active material, a material capable of reversibly intercalating or deintercalating lithium ion ($Li^-$), a material capable of reversibly forming a lithium-containing compound by reacting with lithium ions, lithium metal or a lithium alloy may be included. Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions ($Li^+$) may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn). Preferably, the negative electrode active material may be lithium metal, and specifically, may have a lithium metal thin film or lithium metal powder form.

A method for forming the negative electrode active material is not particularly limited, and methods of forming a layer or membrane commonly used in the art may be used. For example, methods of compression, coating or deposition may be used. In addition, a case of assembling a battery without having a lithium thin film on a current collector, and then forming a metal lithium thin film on a metal plate by initial charge is also included in the negative electrode of the present invention.

The separator is for physically separating both electrodes in the lithium-sulfur battery of the present invention, and those commonly used as a separator in a lithium-sulfur battery may be used without particular limit, and particularly, those having an excellent electrolyte moisture retention ability while having low resistance for ion migration of the electrolyte are preferred.

The separator may be formed with a porous substrate, and as the porous substrate, porous substrates commonly used in an electrochemical device may all be used, and for example, polyolefin-based porous membranes or non-woven fabrics may be used, however, the porous substrate is not particularly limited thereto.

Examples of the polyolefin-based porous membrane may include membranes formed with a polymer using a polyolefin-based polymer such as polyethylene such as high density polyethylene, linear low density polyethylene, low density polyethylene and ultra-high molecular weight polyethylene, polypropylene, polybutylene and polypentene alone, or formed with a polymer mixing these.

As the non-woven fabric other than the polyolefin-based non-woven fabric described above, non-woven fabrics formed with a polymer using, for example, polyethylene terephthalate, polybutylene terephthalate, polyester, polyacetal, polyamide, polycarbonate, polyimide, polyetheretherketone, polyether sulfone, polyphenylene oxide, polyphenylene sulfide, polyethylene naphthalate polyester and the like alone, or formed with a polymer mixing these may be included. A structure of the non-woven fabrics may include spunbond non-woven fabrics or meltblown non-woven fabrics formed with long fibers.

The thickness of the porous substrate is not particularly limited, but may be from 1 μm to 100 μm and preferably from 5 μm to 50 μm.

Sizes of pores present in the porous substrate and porosity are not particularly limited as well, but may be from 0.001 μm to 50 μm and 10% to 95%, respectively.

The electrolyte includes lithium ions, which is for producing an electrochemical oxidation or reduction reaction in the positive electrode and the negative electrode using this as a medium.

The electrolyte may be a non-aqueous electrolyte liquid or a solid electrolyte that does not react with lithium metal, but is preferably a non-aqueous electrolyte liquid, and includes an electrolyte salt and an organic solvent.

The electrolyte salt included in the non-aqueous electrolyte liquid is a lithium salt. The concentration of the lithium salt may be from 0.2 M to 2 M, specifically from 0.4 M to 2 M and more specifically from 0.4 M to 1.7 M depending on various factors such as an accurate composition of the electrolyte solvent mixture, solubility of the salt, conductivity of the dissolved salt, charge and discharge conditions of a battery, a working temperature, and other factors known in the lithium battery field. When the concentration of the lithium salt is less than 0.2 M, conductivity of the electrolyte may decrease causing decline in the electrolyte performance, and when the concentration of the lithium salt concentration is greater than 2 M, viscosity of the electrolyte increases leading to a decrease in the lithium ion mobility.

The lithium salt may be used without limit as long as it is commonly used in an electrolyte liquid for a lithium-sulfur battery. For example, at least one selected from the group consisting of LiSCN, LiBr, LiI, $LiPF_6$, $LiBF_4$, $LiB_{10}Cl_{10}$, $LiSO_3CF_3$, LiCl, $LiClO_4$, $LiSO_3CH_3$, LiB $(Ph)_4$, LiC $(SO_2CF_3)_3$, LiN $(CF_3SO_2)_2$, $LiCF_3CO_2$, $LiAsF_6$, $LiSbF_6$, $LiAlCl_4$, LiFSI, chloroborane lithium, lower aliphatic carboxylic acid lithium and the like may be included.

As the organic solvent included in the non-aqueous electrolyte liquid, those commonly used in an electrolyte for a lithium secondary battery may be used without limit, and for example, ether, ester, amide, linear carbonate, cyclic carbonate and the like may be used either alone or as a mixture of two or more types. Among these, an ether-based compound may be typically included.

The ether-based compound may include non-cyclic ether and cyclic ether.

Examples of the non-cyclic ether may include at least one selected from the group consisting of dimethyl ether, diethyl ether, dipropyl ether, methylethyl ether, methylpropyl ether, ethylpropyl ether, ethylene glycol dimethyl ether, ethylene glycol diethyl ether, ethylene glycol ethylmethyl ether, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether and polyethylene glycol methylethyl ether, but are not limited thereto.

Examples of the cyclic ether may include at least one selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxybenzene, 1,3-dimethoxybenzene, 1,4-dimethoxybenzene and isosorbide dimethyl ether, but are not limited thereto.

Examples of the ester as the organic solvent may include any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types thereof, however, the ester is not limited thereto.

Specific examples of the linear carbonate may include any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, however, the linear carbonate is not limited thereto.

Specific examples of the cyclic carbonate may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halide thereof may include fluoroethylene carbonate (FEC) and the like, but are not limited thereto.

The non-aqueous electrolyte liquid may be injected at a proper stage in an electrochemical device manufacturing process depending on a manufacturing process and required properties of a final product. In other words, the non-aqueous electrolyte liquid may be used at a stage prior to assembling an electrochemical device or at a final stage of electrochemical device assembly.

The lithium-sulfur battery according to the present invention may go through lamination (stack) and folding processes of a separator and an electrode in addition to winding, a general process.

The shape of the lithium-sulfur battery depends on a battery packaging material, and may employ various shapes such as a cylinder-type, a lamination-type, a coin-type or a pouch-type. Preferably, the lithium-sulfur battery of the present invention may be a coin-type or a pouch-type. Particularly, the lithium-sulfur battery including the positive electrode according to the present invention may exhibit excellent performance and lifetime properties even when manufactured to a pouch cell.

In addition, the present invention provides a battery module including the lithium-sulfur battery as a unit cell.

The battery module may be used as a power supply of medium to large-sized devices requiring high-temperature stability, long cycle properties and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including electric bikes (e-bikes) and electric scooters (e-scooters); electric golf carts; systems for power storage, and the like, but are not limited thereto.

MODE FOR INVENTION

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also fall within the scope of the attached claims.

EXAMPLE AND COMPARATIVE EXAMPLE

Example 1

In a reactor, 4.2 g of sulfur and 1.8 g of carbon nanotubes were evenly mixed, and then the result was heat treated for 30 minutes at 155° C. to prepare a sulfur-carbon composite.

Subsequently, 87% by weight of the prepared sulfur-carbon composite (S:C=7:3) as a positive electrode active material, 5% by weight of carbon fiber (VGCF, manufactured by Showa Denko K.K.) as a conductive material, and 7% by weight of lithium polyacrylate and 1% by weight of polyvinyl alcohol as a binder were mixed to prepare a positive electrode slurry composition.

Then, the prepared slurry composition was coated on an aluminum current collector, and the result was dried for 12 hours at 50° C. to prepare a positive electrode.

The positive electrode was used after punched to a 14 phi circular electrode, a polyethylene (PE) separator was used after punched to 19 phi, and lithium metal having a thickness of 43 μm to 16 phi as a negative electrode. In addition, an electrolyte formed with 2-methyltetrahydrofuran (2-MeTHF): ethylene glycol ethylmethyl ether (EGEME) (3:6, v/v), 0.75 M $LiN(CF_3SO_2)_2$ (LiTFSI) and 3% by weight $LiNO_3$ was used.

After that, a coin-type lithium-sulfur battery including the positive electrode, the separator, the negative electrode and the electrolyte prepared as described above was manufactured.

Example 2

A pouch-type lithium-sulfur battery was manufactured in the same manner as in Example 1 except that the lithium-sulfur battery was manufactured to a pouch-type using a stacking method.

Comparative Example 1

A coin-type lithium-sulfur battery was manufactured in the same manner as in Example 1 except that the sulfur-carbon composite was used in 88% by weight without using polyvinyl alcohol when preparing the positive electrode slurry composition.

Comparative Example 2

A coin-type lithium-sulfur battery was manufactured in the same manner as in Example 1 except that, instead of the polyvinyl alcohol, polyvinyl pyrrolidone was used in the same content when preparing the positive electrode slurry composition.

Comparative Example 3

A pouch-type lithium-sulfur battery was manufactured in the same manner as in Example 2 except that the sulfur-carbon composite was used in 88% by weight without using polyvinyl alcohol when preparing the positive electrode slurry composition.

Experimental Example 1. Evaluation on Battery Performance

For the batteries manufactured in the examples and the comparative examples, specific discharge capacity was measured while repeatedly progressing a cycle of charging/discharging 2.5 times with an initial 0.1 C rate and repeating charging and discharging 3 times with a 0.2 C rate, then charging with a 0.3 C rate and discharging with a 0.5 C rate in the case of the coin cell, and repeatedly progressing a cycle of discharging once with an initial 0.05 C rate, repeating charging and discharging 3 times with a 0.1 C rate, then charging with a 0.1 C rate and discharging with a 0.2 C rate in the case of the pouch cell using a charge and discharge measuring device to identify lifetime properties. Results obtained herein are shown in FIG. 1 and FIG. 2.

Figure 3:
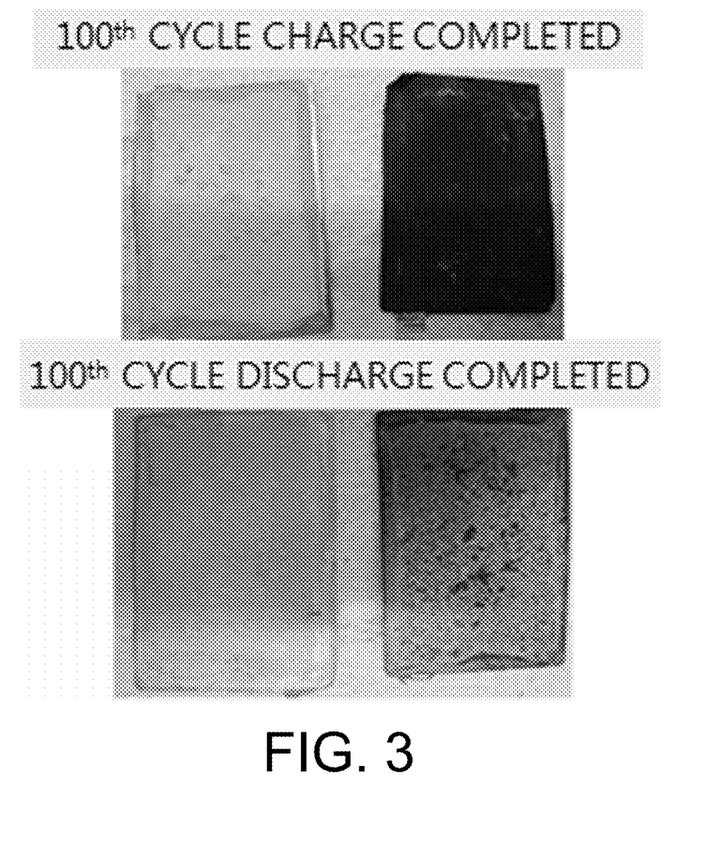
FIG. 3 presents electrode images of a battery manufactured in Example 2 of the present invention after evaluation according to Experimental Example 1.
Figure 4:
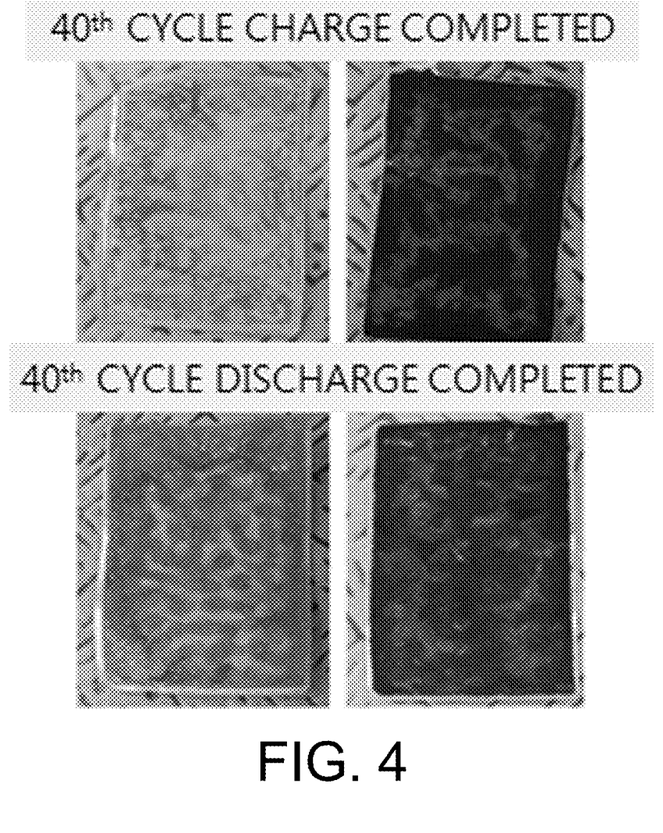
FIG. 4 presents electrode images of a battery manufactured in Comparative Example 3 of the present invention after evaluation according to Experimental Example 1.

Additionally, for each of the batteries of Example 2 and Comparative Example 3, the battery was disassembled after finishing the cycles, and the positive electrode and the negative electrode were visually observed. Results obtained herein are shown in FIG. 3 and FIG. 4. The left side is the negative electrode and right side is the positive electrode.

Figure 1:
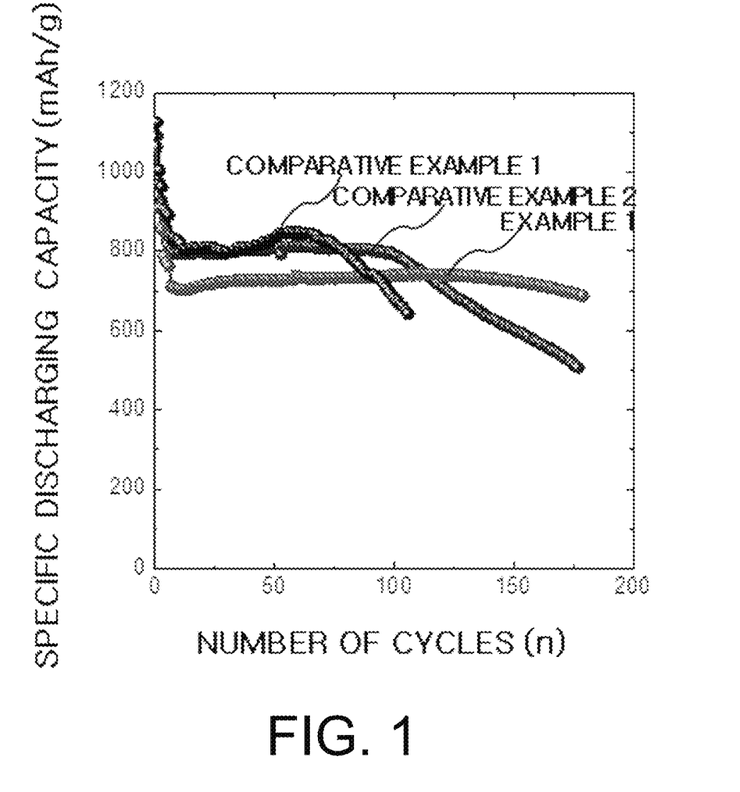
FIG. 1 is a graph presenting results of performance evaluation on batteries manufactured in Example 1, Comparative Example 1 and Comparative Example 2 of the present invention.
Figure 2:
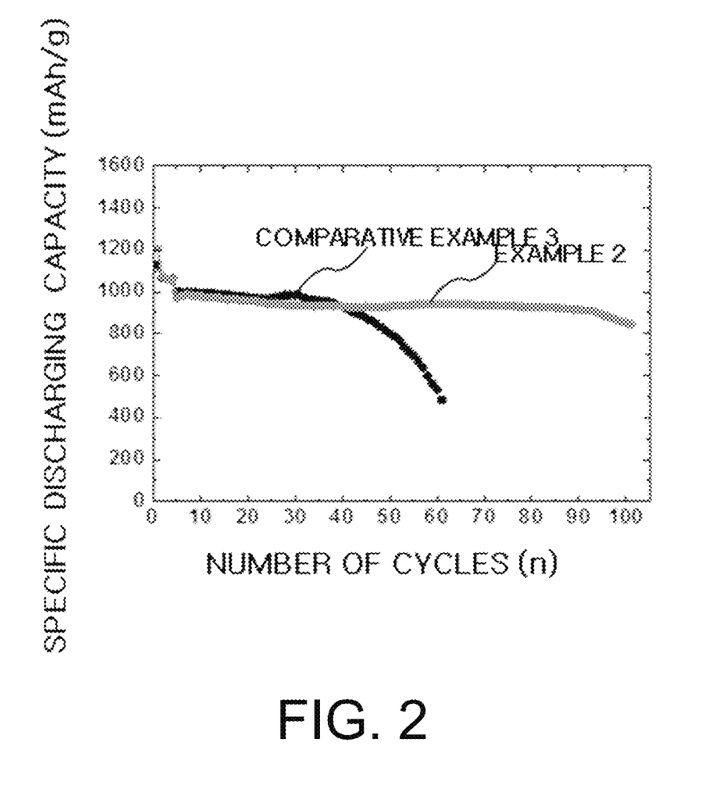
FIG. 2 is a graph presenting results of performance evaluation on batteries manufactured in Example 2 and Comparative Example 3 of the present invention.

When referring to FIGS. 1 and 2, it was identified that the battery including the positive electrode according to the present invention had superior lifetime properties compared to the batteries of the comparative examples.

Specifically, FIG. 1 relates to a coin-type battery, and compared to the coin-type battery according to Example 1 including lithium polyacrylate and polyvinyl alcohol as a binder maintaining initial capacity of approximately 700 mAh/g after 150 cycles, capacity rapidly decreased after 60 cycles in Comparative Example 1 including only lithium polyacrylate, and after 100 cycles in Comparative Example 2 including lithium polyacrylate and polyvinyl pyrrolidone.

FIG. 2 relates to a pouch-type battery, and it was identified that, compared to the pouch-type battery according to Example 2 maintaining capacity of 850 mAh/g or greater, approximately 85% of initial capacity, for 100 cycles, the battery according to Comparative Example 3 had capacity rapidly deteriorated after 40 cycles.

Through these results, it was seen that the battery including the positive electrode according to the present invention had an excellent capacity retention rate and thereby had enhanced lifetime properties compared to the comparative examples in both the coin cell and the pouch cell.

In addition, as shown in FIG. 3 and FIG. 4, it was identified that battery morphology was even after the cycle was finished in Example 2 compared to Comparative Example 3, and through this, it was identified that a uniform charge and discharge reaction progressed when including the positive electrode according to the present invention compared to existing positive electrodes.

The invention claimed is:

1. A lithium-sulfur battery comprising a positive electrode, a negative electrode, a separator and an electrolyte interposed between the positive electrode and the negative electrode,
   wherein the positive electrode comprises a positive electrode active material and a first binder;
   wherein the first binder comprises:
   lithium polyacrylate; and
   polyvinyl alcohol,
   wherein the lithium polyacrylate has a molecular weight of 450,000 to 1,250,000; and
   wherein the polyvinyl alcohol has a viscosity of 3.2 mPas to 3.6 mPas, and a degree of saponification of 87 mol % to 89 mol %.

2. The lithium-sulfur battery of claim 1,
   wherein the lithium polyacrylate is present in an amount of 85% by weight to 95% by weight based on a total weight of the binder and
   the polyvinyl alcohol is present in an amount of 5% by weight to 15% by weight, based on the total weight of the binder.

3. The lithium-sulfur battery of claim 1, wherein the lithium polyacrylate and the polyvinyl alcohol are present in a weight ratio of 85:15 to 95:5.

4. The lithium-sulfur battery of claim 1, wherein the positive electrode further comprises at least one selected from the group consisting of a conductive material and a second binder, wherein the second binder is different from the first binder.

5. The lithium-sulfur battery of claim 1, wherein the positive electrode active material comprises at least one selected from the group consisting of inorganic sulfur of formula $S_8$, $Li_2S_n$ wherein $n \geq 1$, disulfide compounds, organosulfur compounds and carbon-sulfur polymers of formula $(C_2S_x)_n$, wherein $x=2.5$ to $50$ and $n \geq 2$.

6. The lithium-sulfur battery of claim 1, wherein the lithium polyacrylate has a molecular weight of 750,000 to 1,250,000.

* * * * *